(12) United States Patent
Kim et al.

(10) Patent No.: US 10,209,811 B2
(45) Date of Patent: Feb. 19, 2019

(54) MOBILE TERMINAL DEVICE AND DRIVING METHOD THEREOF

(71) Applicant: LG Display Co., Ltd., Seoul (KR)

(72) Inventors: Eun Jung Kim, Seoul (KR); Ki Duk Kim, Paju-si (KR); Sung Yong Cho, Seoul (KR); Ki Seon Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 222 days.

(21) Appl. No.: 14/842,660

(22) Filed: Sep. 1, 2015

(65) Prior Publication Data
US 2016/0062542 A1     Mar. 3, 2016

(30) Foreign Application Priority Data

Sep. 2, 2014   (KR) .................. 10-2014-0116347

(51) Int. Cl.
| | | |
|---|---|---|
| *G06F 3/01* | (2006.01) | |
| *G06F 3/041* | (2006.01) | |
| *G06F 3/044* | (2006.01) | |
| *H04M 1/673* | (2006.01) | |
| *G06F 3/0488* | (2013.01) | |

(52) U.S. Cl.
CPC ............ *G06F 3/0416* (2013.01); *G06F 3/016* (2013.01); *G06F 3/044* (2013.01); *G06F 3/0414* (2013.01); *G06F 3/04883* (2013.01); *H04M 1/673* (2013.01); *G06F 2203/04103* (2013.01); *G06F 2203/04105* (2013.01); *H04M 2250/22* (2013.01)

(58) Field of Classification Search
None
See application file for complete search history.

(56) References Cited

U.S. PATENT DOCUMENTS

2009/0195959 A1* 8/2009 Ladouceur ............ G06F 3/0202
361/283.1
2012/0038583 A1   2/2012 Westhues et al.
(Continued)

FOREIGN PATENT DOCUMENTS

| CN | 101498977 | 8/2009 |
|---|---|---|
| CN | 101819486 A | 9/2010 |

(Continued)

OTHER PUBLICATIONS

Office Action for Taiwanese Patent Application No. TW 104128860, dated Jun. 28, 2016, 11 Pages (With Concise Explanation of Relevance).

(Continued)

*Primary Examiner* — Gustavo D Polo
(74) *Attorney, Agent, or Firm* — Fenwick & West LLP

(57) ABSTRACT

Disclosed is a mobile terminal device in which a locking mode is released based on a touch intensity in order to prevent an unlocking operation by an unintended touch, and a driving method thereof, wherein the driving method includes detecting a touch intensity for each touch when a plurality of touches occur in a locking mode, and releasing the locking mode on the basis of the plurality of touch intensities detected, or executing a function corresponding to the plurality of touch intensities detected.

20 Claims, 10 Drawing Sheets

(56) References Cited

U.S. PATENT DOCUMENTS

| | | | |
|---|---|---|---|
| 2012/0113061 A1* | 5/2012 | Ikeda | G06F 3/041 |
| | | | 345/175 |
| 2013/0082970 A1 | 4/2013 | Frey et al. | |
| 2013/0120398 A1 | 5/2013 | Smyth et al. | |
| 2013/0314336 A1 | 11/2013 | Ting | |
| 2014/0092046 A1 | 4/2014 | Tian | |
| 2014/0152618 A1 | 6/2014 | Ando | |
| 2015/0153887 A1 | 6/2015 | Kim et al. | |
| 2015/0370356 A1* | 12/2015 | Hwang | G06F 3/041 |
| | | | 345/173 |
| 2015/0370372 A1* | 12/2015 | Withers | G06F 3/044 |
| | | | 345/174 |

FOREIGN PATENT DOCUMENTS

| | | |
|---|---|---|
| CN | 102203705 A | 9/2011 |
| CN | 102637061 A | 8/2012 |
| CN | 103076981 A | 5/2013 |
| CN | 103425421 | 12/2013 |
| EP | 2708994 A2 | 3/2014 |
| JP | 2013-529803 | 7/2013 |
| JP | 2013-205986 | 10/2013 |
| JP | 2013-537673 | 10/2013 |
| JP | 2015-106417 | 6/2015 |
| TW | 201349017 A | 12/2013 |
| WO | WO 2011/156447 A1 | 12/2011 |
| WO | WO 2013-021835 | 3/2015 |

OTHER PUBLICATIONS

Office Action for Japanese Patent Application No. JP 2015-162630, dated Aug. 9, 2016, 7 Pages (With Concise Explanation of Relevance).

First Office Action for Chinese Patent Application for CN 201510552490.0, dated Nov. 1, 2017, 19 Pages (With English Translation).

The State Intellectual Property Office of the People's Republic of China, Second Office Action, CN Patent Application No. 201510552490.0, dated Jun. 22, 2018, 21 pages.

* cited by examiner

MOBILE TERMINAL DEVICE AND DRIVING METHOD THEREOF

CROSS REFERENCE TO RELATED APPLICATIONS

This application claims the benefit of Korean Patent Application No. 10-2014-0116347 filed on Sep. 2, 2014, which is hereby incorporated by reference in its entirety.

BACKGROUND

Field of the Disclosure

Embodiments of the present invention relate to a mobile terminal device and a driving method thereof, and more particularly, to a mobile terminal device capable of preventing an unlocking operation by an unintended touch, and a driving method thereof.

Discussion of the Related Art

With a rapid advancement of a communication technology, a function of a mobile terminal device extends, whereby various user interfaces (UI) and various functions using the same are provided to the mobile terminal device.

Generally, a mobile terminal device with a touch screen may include locking and unlocking functions for restricting unnecessary input errors in a standby state or preventing other people's use.

In case of the mobile terminal device with the unlocking function, the unlocking function is executed if any input does not occur for a preset time period by a user. Accordingly, a user releases a locking mode by a preset unlocking method, and then uses a desired function of the mobile terminal device. For example, the related art unlocking method may be a touch-and-drag method in a preset area.

However, in case of the related art unlocking method, the locking mode may be released by a user's unintended touch, which may cause a malfunction of the mobile terminal device.

SUMMARY

Accordingly, embodiments of the present invention are directed to a mobile terminal device that substantially obviates one or more problems due to limitations and disadvantages of the related art, and a driving method thereof.

An aspect of embodiments of the present invention is directed to provide a mobile terminal device in which a locking mode is released based on a touch intensity in order to prevent an unlocking operation by an unintended touch, and a driving method thereof.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there is provided a driving method of a mobile terminal device with a touch screen that may include detecting a touch intensity for each touch when a plurality of touches occur in a locking mode, and releasing the locking mode on the basis of the plurality of touch intensities detected, or executing a function corresponding to the plurality of touch intensities detected.

In another aspect of the embodiment of the present invention, there is provided a driving method of a mobile terminal device with a touch screen that may include detecting a touch location and a touch intensity of each touch when a plurality of touches occurs in a locking mode, detecting a touch intensity by each touch location in accordance with the detected touch location and touch intensity, and releasing the locking mode on the basis of the touch intensity by each touch location.

In another aspect of the embodiment, a mobile terminal device includes a touch screen, a touch driver for generating sensing data by sensing a touch on the touch screen, and a controller for detecting a touch intensity for each of the plurality of touches on the basis of the sensing data for each of the plurality of touches provided from the touch driver on a locking mode, and releasing the locking mode or executing a function corresponding to the plurality of detected touch intensities It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
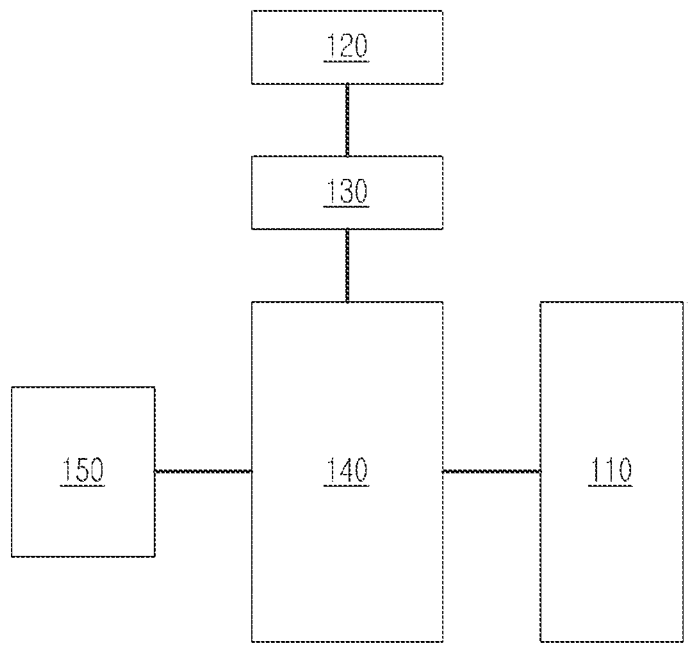
FIG. 1 illustrates a mobile terminal device according to one embodiment of the present invention.

Reference will now be made in detail to the exemplary embodiments of the present invention, examples of which are illustrated in the accompanying drawings. Wherever possible, the same reference numbers will be used throughout the drawings to refer to the same or like parts.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted. In a case where 'comprise', 'have', and 'include' described in the present specification are used, another part may be added unless 'only~' is used. The terms of a singular form may include plural forms unless referred to the contrary. In construing an element, the element is construed as including an error region although there is no explicit description.

In description of embodiments of the present invention, when a structure (for example, an electrode, a line, a wiring, a layer, or a contact) is described as being formed at an upper portion/lower portion of another structure or on/under the other structure, this description should be construed as including a case where the structures contact each other and moreover, a case where a third structure is disposed therebetween.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Hereinafter, a mobile terminal device according to the embodiment of the present invention and a driving method thereof will be described with reference to the accompanying drawings. A driving method is also referred to herein as a method of operating a mobile terminal device.

FIG. 1 illustrates a mobile terminal device according to one embodiment of the present invention.

Referring to FIG. 1, the mobile terminal device according to one embodiment of the present invention may include a display part 110, a touch screen 120, a touch driver 130, a controller 140 and a storing part 150 (e.g., a storage component.)

The display part 110 may include a display panel and a panel driver. The display panel may be a liquid crystal display panel or an organic light emitting display panel. In response to video data and a panel control signal provided from the controller 140, a predetermined image is displayed on the display panel by the panel driver.

The touch screen 120 may include a plurality of touch driving electrodes, a plurality of touch sensing electrodes which intersect with the plurality of touch driving electrodes, and a plurality of touch sensors which are provided at intersections of the touch driving electrode and the touch sensing electrode.

In accordance with a user's touch on the touch screen 120, a resistance value, a capacitance value or any other property of the touch sensor may be changed in a touch area. Especially, a touch intensity corresponding to a pressure applied to the touch area of the touch screen 120 may be sensed by the plurality of touch sensors in accordance with a user's touch. For example, the touch screen 120 may sense a touch location and touch intensity corresponding to a user's touch by the use of resistive type, piezo-electric type, capacitance type or electro-active polymer type touch sensor.

The touch driver 130 generates a touch location sensing signal for the touch location by sensing a change in a property of the touch sensor in accordance with a user's touch, converts the touch location sensing signal into touch location sensing data, and provides the touch location sensing data to the controller 140. Also, in response to control signals generated by the controller 140, the touch driver 130 generates a touch intensity sensing signal for the touch intensity by sensing a change in a property of the touch sensor at the touch location, converts the touch intensity sensing signal into touch intensity sensing data, and provides the touch intensity sensing data to the controller 140. For example, the touch driver 130 supplies a touch driving pulse to the plurality of touch driving electrodes, and also senses the change in a property of the touch sensor through the plurality of touch sensing electrodes, to thereby provide the touch location sensing data and the touch intensity sensing data to the controller 140.

The controller 140 controls an overall operation of the mobile terminal device. Hereinafter, only functions related with embodiments of the present invention among various functions of the controller 140 will be described in detail as follows.

The controller 140 executes a corresponding application in accordance with a user's input via a user interface, generates a panel control signal and video data corresponding to the executed application, and provides the generated panel control signal and video data to the display part 110, whereby an image is displayed on the display panel.

Also, the touch driver 130 is driven in a touch location sensing mode and a touch intensity sensing mode under the control of the controller 140. The controller 140 detects a touch location based on the sensing data provided from the touch driver 130 in accordance with each mode of the touch location sensing mode and the touch intensity sensing mode, and executes a function corresponding to the detected touch location in the mobile terminal device.

If there is no touch input and button input from a user for a preset time period, the mode of the mobile terminal device is changed to a locking mode (or standby mode) by the controller 140.

If there are a plurality of touches for releasing the locking mode, the controller 140 according to the first example detects the plurality of touch intensities from the touch intensity sensing data of the plurality of touches provided from the touch driver 130, and then releases the locking mode or maintains the execution of the locking mode in accordance with the plurality of detected touch intensities. Generally, a user's touch intensity for executing the function of the mobile terminal device is higher than an unintended touch intensity. Thus, on the basis of the touch intensity, the locking mode is released only when there is a user's intended touch so that it is possible to prevent the locking mode from being released by a user's unintended touch.

Figure 2:
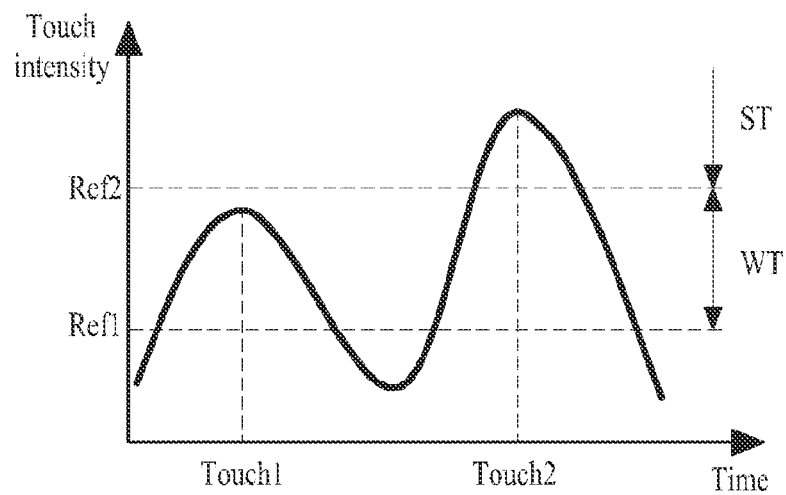
FIG. 2 illustrates a weak touch and a strong touch in a touch intensity according to one embodiment of the present invention.

In more detail, a first reference value and a second reference value are stored in the storing part 150, wherein the second reference value is larger than the first reference value. Then, an input touch intensity combination is detected by classifying the plurality of touch intensities detected in the locking mode into weak and strong touches with respect to the first and second reference values. Thereafter, the controller 140 releases the locking mode or maintains the execution of the locking mode according to whether an unlocking intensity combination, which is preset by the combination of the weak touch and the strong touch in accordance with a user's setting and stored in the storing part 150, is matched to the input touch intensity combination. In this case, as shown in FIG. 2, the weak touch (WT) may have a touch intensity between the first reference value (Ref1) and the second reference value (Ref2), and the strong touch (ST) may have a touch intensity above the second reference value (Ref2). Meanwhile, a touch whose touch intensity is below the first reference value (Ref1) is not regarded as a touch for an unlocking mode. Herein, the first reference value (Ref1) may be reset in a range below the second reference value (Ref2) by a user, and the second reference value (Ref2) may be reset in a range above the first reference value (Ref1) by a user.

Each of the unlocking intensity combination and the input touch intensity combination may be any one case in the total number of cases corresponding to the number of touch inputs for the unlocking mode and the combination of weak touch and strong touch. For example, if the number of touch inputs for the unlocking mode is 'N', each of the unlocking intensity combination and the input touch intensity combination may be the combination of weak touch and strong touch in accordance with any one of $N^2$ possible cases.

If the unlocking intensity combination is stored in the storing part 150 in such a manner that the intensities of the first to third touches are combined in order of weak touch, weak touch and strong touch, the controller 140 according to the first example releases the locking mode on the basis of the touch intensity for each of the first to third touches occurring in the locking mode. That is, the controller 140 releases the locking mode when the input touch intensity combination according to the touch intensities of the first to third touches for the unlocking mode is formed in order of the weak touch, weak touch and strong touch, and is matched to the preset unlocking intensity combination. Meanwhile, when the input touch intensity combination is not matched to the preset unlocking intensity combination, the controller 140 maintains the locking mode. As a result, the locking mode is released based on the touch intensity so that it is possible to prevent the locking mode from being released by an unintended touch.

Meanwhile, the controller 140 according to the first example may execute the locking mode on the basis of the touch intensity for each of the plurality of touches occurring for a driving mode in which the locking mode is released. That is, the controller 140 according to the first example executes the locking mode when there are the plurality of touches by the input touch intensity combination which is matched to the unlocking intensity combination, and the controller 140 according to the first example maintains the driving mode when the input touch intensity combination is not matched to the unlocking intensity combination.

Also, the controller 140 according to the first example detects the input touch intensity combination based on the plurality of touches occurring in the locking mode, releases the locking mode in accordance with the detected input touch intensity combination, and simultaneously executes a function (or application) corresponding to the detected input touch intensity combination. That is, the controller 140 according to the first example releases the locking mode in accordance with the intensity in each of the plurality of touches occurring in the locking mode, and simultaneously executes a shortcut function for executing the function.

In detail, the controller 140 according to the first example detects the input touch intensity combination by classifying the plurality of touch intensities detected in the locking mode into the weak touch and the strong touch. Then, if a touch scenario which is matched to the detected input touch intensity combination exists in a plurality of touch scenarios preset by a user and stored in the storing part 150, the controller 140 according to the first example releases the locking mode, and simultaneously executes the function set in the touch scenario which is matched to the input touch intensity combination. Meanwhile, if a touch scenario which is matched to the detected input touch intensity combination does not exist in a plurality of touch scenarios preset by a user and stored in the storing part 150, the controller 140 according to the first example maintains the execution of the locking mode. In this case, each of the plurality of touch scenarios is made of the combination of weak touch and strong touch selected by a user, and is set with each function of the mobile terminal device selected by a user. For example, each of the plurality of scenarios may be set as shown in the following Table 1.

TABLE 1

| Touch scenario | Intensity of first touch | Intensity of second touch | Function |
|---|---|---|---|
| 1 | Weak touch | Weak touch | Access to home panel |
| 2 | Weak touch | Strong touch | Access to contact list |
| 3 | Strong touch | Weak touch | Execution of Internet function |
| 4 | Strong touch | Strong touch | Execution of camera function |

Referring to the above Table 1, if the first and second touches detected in the locking mode correspond to the touch scenario 1 made by the combination of weak touch and weak touch, the controller 140 according to the first example releases the locking mode, and simultaneously displays a home panel on a screen of the mobile terminal device. If the first and second touches detected in the locking mode correspond to the touch scenario 4 made by the combination of strong touch and strong touch, the controller 140 according to the first example releases the locking mode, and simultaneously executes the camera function. Accordingly, a user sets the touch scenario of the desired function in accordance with the touch intensity for each of the plurality of touches, and executes the plurality of touches with the touch intensities corresponding to the preset touch scenario so that it is possible to execute the desired function in the locking mode without an additional touch for executing the desired function after the touch for the unlocking mode.

The controller 140 according to the second example detects the plurality of touch locations from the touch location sensing data of each of the plurality of touches provided from the touch driver 130 when the plurality of touches for releasing the locking mode occurs in the locking mode. The controller 140 detects the touch intensity by each touch location from the touch intensity sensing data in each of the plurality of touches, and releases the locking mode or maintains the execution of the locking mode in accordance with the touch intensity by each touch location.

In detail, the controller 140 according to the second example extracts the input touch intensity combination by classifying the touch intensity by each touch location, which is detected in the locking mode, into the weak touch or strong touch based on the first and second reference values stored in the storing part 150, wherein the second reference value is larger than the first reference value. Then, the controller 140 according to the second example releases or maintains the locking mode according to whether the unlocking intensity combination stored in the storing part 150 and preset by the combination of weak touch and strong touch by each touch location in accordance with a user's set is matched to the detected input touch intensity combination. That is, the controller 140 according to the second example releases the locking mode based on the touch intensity by each touch location in each of the plurality of touches occurring in the locking mode, thereby enhancing security of the locking mode through a double security function of the touch location and the touch intensity.

Furthermore, the controller 140 according to the second example detects the combination of strong touch based on the intensity by each touch location of the plurality of touches occurring in the locking mode in the same manner as the controller 140 according to the first example. Then, if a touch scenario which is matched to the detected input touch intensity combination exists in a plurality of touch scenarios stored in the storing part 150, the controller 140 according to the second example releases the locking mode, and simultaneously executes the function set in the touch scenario which is matched to the input touch intensity combination. Meanwhile, if a touch scenario which is matched to the detected input touch intensity combination does not exist in a plurality of touch scenarios stored in the storing part 150, the controller 140 according to the second example maintains the execution of the locking mode.

In addition, in each of the embodiments according to the first example and the second example, the controller 140 may detect a haptic area based on the touch location in accordance with a user's touch, generate a touch driving pulse in accordance with the touch intensity, and apply the touch driving pulse to the touch driving electrode included in the haptic area, to thereby provide a haptic effect such as vibration in the haptic area. Through the haptic effect, the touch intensity for a user's touch may be provided as feedback to a user so that a user can perceive the touch intensity and also generate the input touch intensity combination, whereby a user can remember the touch intensity for the input touch intensity combination.

Figure 3:
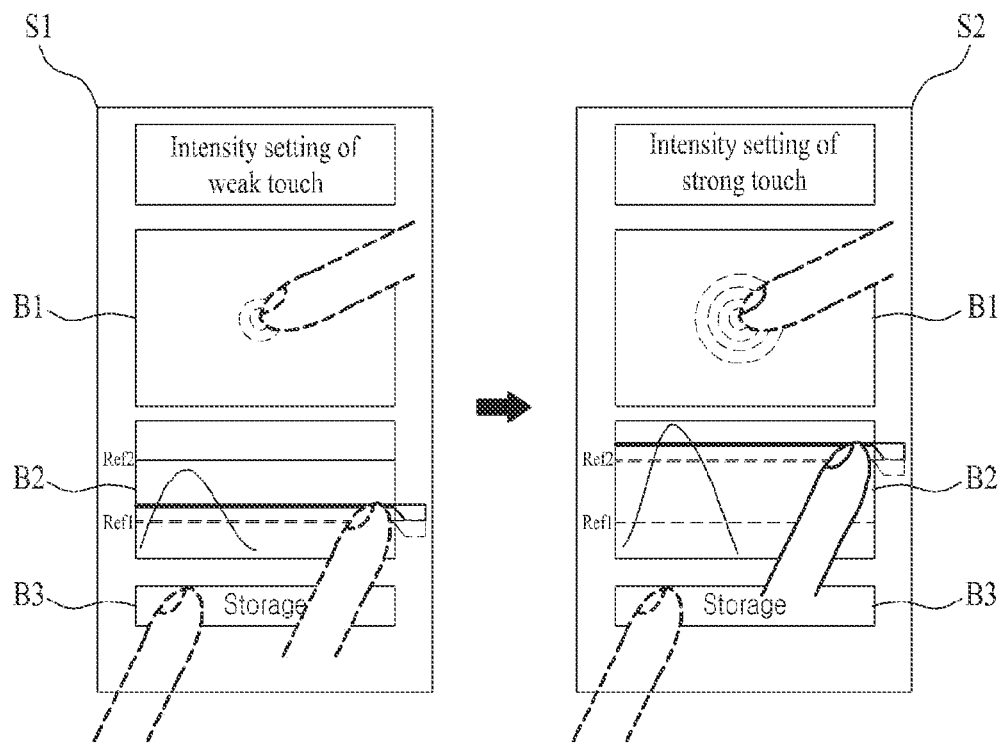
FIG. 3 exemplarily illustrates a screen for setting a touch intensity in each of weak and strong touches in the mobile terminal device according to one embodiment of the present invention.

FIG. 3 illustrates a screen for setting the intensity of each of the weak touch and the strong touch in the mobile terminal device according to one embodiment of the present invention.

Referring to FIG. 3 in connection with FIG. 1, if a user selects an intensity setting menu of the weak touch from a setting menu of the mobile terminal device through a user interface, the controller 140 according to the embodiment of the present invention displays an intensity setting screen (S1) of the weak touch on the display part 110. In this case, the intensity setting screen (S1) of the weak touch may include a user touch box (B1) and a touch intensity display box (B2).

According to a request of the weak touch by the controller 140, a user touches the user touch box (B1) by the intensity of the weak touch. Thus, when the touch occurs in the user touch box (B1), the controller 140 detects the touch intensity corresponding to the user's touch, and displays the detected touch intensity on the touch intensity display box (B2), whereby a user perceives the touch intensity of the weak touch. In this case, the controller 140 may generate a haptic driving signal corresponding to the detected touch intensity, to thereby provide the haptic effect in the user's touch location.

Then, a user may set a reference value of the desired weak touch by adjusting a first and/or second reference line corresponding to each of the first and second reference values (Ref1, Ref2) displayed on the touch intensity display box (B2) through a touch-and-drag method.

If a user touches a storing box (B3) on the intensity setting screen (S1) of the weak touch, the controller 140 resets the touch intensity corresponding to the location of the adjusted first and/or second reference line to the first and second reference values (Ref1, Ref2) for defining the weak touch, and stores the reset values in the storing part 150. At this time, the controller 140 repetitively executes the user's touch input for setting the touch intensity of the weak touch at least three times, finally sets the first and second reference values (Ref1, Ref2) for defining the weak touch, and stores the finally-set first and second reference values (Ref1, Ref2) in the storing part 150.

After completing the intensity setting of the weak touch through the intensity setting screen (S1) of the weak touch, the controller 140 displays an intensity setting screen (S2) of the strong touch on the display part 110. In this case, the intensity setting screen (S2) of the strong touch may include a user touch box (B1) and a touch intensity display box (B2).

According to a request of the strong touch by the controller 140, a user touches the user touch box (B1) by the intensity of the strong touch which is relatively stronger than the weak touch. Thus, when the touch occurs in the user touch box (B1), the controller 140 detects the touch intensity corresponding to the user's touch, and displays the detected touch intensity on the touch intensity display box (B2), whereby a user perceives the touch intensity of the strong touch. In this case, the controller 140 may generate a haptic driving signal corresponding to the detected touch intensity, to thereby provide the haptic effect in the user's touch location.

Then, a user may set a reference value of the desired strong touch by adjusting the location of the second reference line corresponding to the second reference value (Ref2) displayed on the touch intensity display box (B2) through the touch-and-drag method.

If a user touches a storing box (B3) on the intensity setting screen (S2) of the strong touch, the controller 140 resets the touch intensity corresponding to the location of the adjusted second reference line to the second reference value (Ref2) for defining the strong touch, and stores the reset value in the storing part 150. At this time, the controller 140 repetitively executes the user's touch input for setting the touch intensity of the strong touch at least three times, finally sets the second reference value (Ref2) for defining the strong touch, and stores the finally-set second reference value (Ref2) in the storing part 150.

Figure 4:
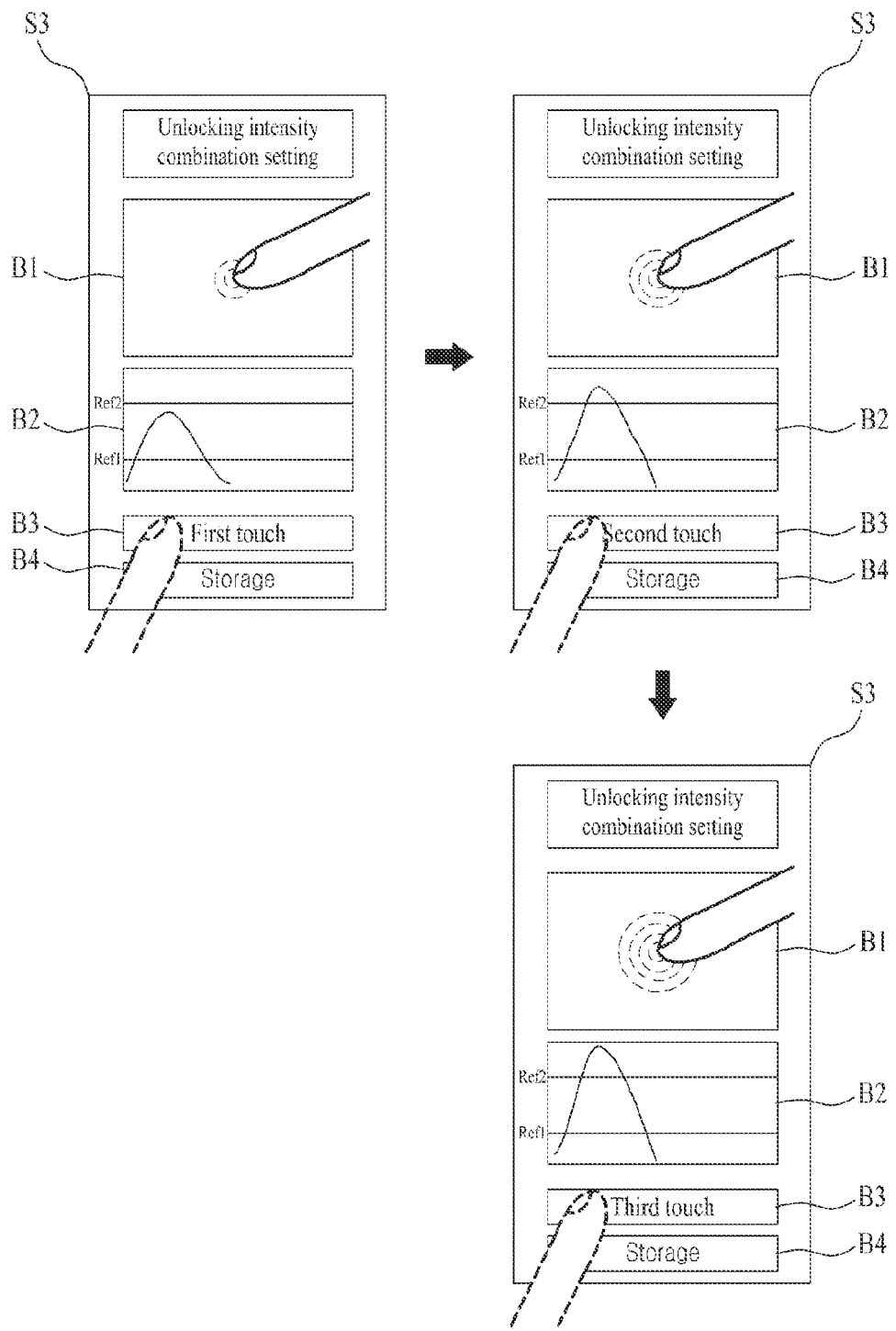
FIG. 4 exemplarily illustrates a screen for setting an unlocking intensity combination in the mobile terminal device according to one embodiment of the present invention.

FIG. 4 illustrates a screen for setting the unlocking intensity combination in the mobile terminal device according to one embodiment of the present invention.

Referring to FIG. 4 in connection with FIG. 1, when a user selects an intensity setting menu of the unlocking intensity combination from a setting menu of the mobile terminal device through a user interface, the controller 140 according to the embodiment of the present invention displays an intensity setting screen (S3) of the unlocking intensity combination on the display part 110. In this case, the intensity setting screen (S3) of the unlocking intensity combination may include a user touch box (B1), a touch intensity display box (B2), a touch order setting box (B3) and a storing box (B4).

According to a request of the touch by the controller 140, a user touches the user touch box (B1) by the intensity of the desired one of the weak touch or strong touch. Thus, when the touch occurs in the user touch box (B1), the controller 140 detects the touch intensity corresponding to the user's touch, and displays the detected touch intensity on the touch intensity display box (B2), whereby a user perceives the touch intensity of the weak touch. In this case, the controller 140 may generate a haptic driving signal corresponding to the detected touch intensity, to thereby provide the haptic effect in the user's touch location.

According to a request of the touch order selection by the controller 140, a user touches the touch order setting box (B3) on the intensity setting screen (S3) of the unlocking intensity combination, to thereby select the touch order. Thus, the controller 140 changes the touch order to which the detected touch intensity is to be applied if the touch order is selected by a user's touch, and the controller 140 maintains the preset touch order if the touch order is not selected by a user. Then, if a user touches the storing box (B4), the controller 140 sets the touch intensity for the selected touch order in the weak touch or strong touch corresponding to the detected touch intensity, and stores the set touch intensity in the storing part 150.

According to the aforementioned method, the controller 140 sets the touch intensity for each touch order of the unlocking intensity combination, and stores the set touch intensity in the storing part 150, thereby completing the intensity setting of the unlocking intensity combination.

Figure 5:
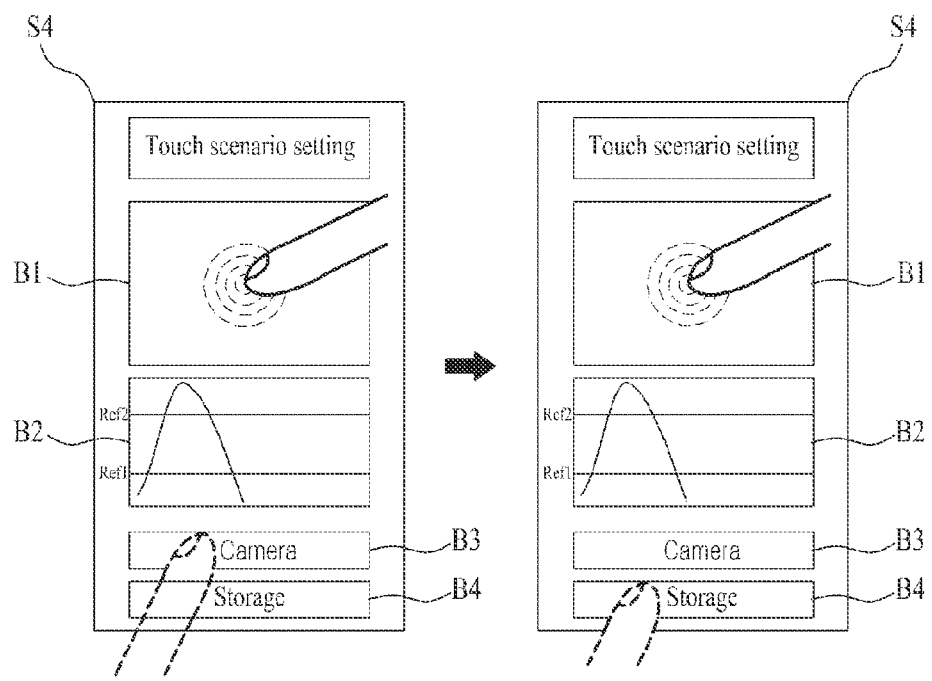
FIG. 5 exemplarily illustrates a screen for setting a touch scenario in the mobile terminal device according to one embodiment of the present invention.

FIG. 5 illustrates a screen for setting the touch scenario in the mobile terminal device according to one embodiment of the present invention.

Referring to FIG. 5 in connection with FIG. 1, when a user selects an intensity setting menu of the touch scenario from a setting menu of the mobile terminal device through a user interface, the controller 140 according to the embodiment of the present invention displays a setting screen (S4) of the touch scenario for setting the touch intensity of the first touch included in the touch scenario on the display part 110.

In this case, the setting screen (S4) of the touch scenario may include a user touch box (B1), a touch intensity display box (B2), a function selection box (B3) and a storing box (B4).

According to a request of the first touch by the controller 140, a user touches the user touch box (B1) by the intensity of the desired one of the weak touch or strong touch. Thus, when the touch occurs in the user touch box (B1), the controller 140 detects the touch intensity corresponding to the user's touch, and displays the detected touch intensity on the touch intensity display box (B2), whereby a user perceives the touch intensity of the weak touch. In this case, the controller 140 may generate a haptic driving signal corresponding to the detected touch intensity, to thereby provide the haptic effect in the user's touch location.

According to a request of the function selection by the controller 140, a user touches the function selection box (B3) on the setting screen (S4) of the touch scenario, thereby selecting the desired function of the mobile terminal device.

If a user touches the storing box (B4), the controller 140 sets the function selected by a user to the function set in the touch scenario, sets the weak touch or strong touch corresponding to the detected touch intensity to the touch intensity of the first touch, and temporarily stores the set function and touch intensity in the storing part 150.

After completing the touch intensity setting of the first touch included in the touch scenario, a setting screen (S4) of the touch scenario for setting the touch intensity of the second touch included in the touch scenario is again displayed on the display part 110. According to a request of the second touch by the controller 140, a user touches the user touch box (B1) by the intensity of the desired one of the weak touch or strong touch. Thus, when the touch occurs in the user touch box (B1), the controller 140 detects the touch intensity corresponding to the user's touch, and displays the detected touch intensity on the touch intensity display box (B2).

Thereafter, a user is re-requested to select the function by the controller 140. Then, the controller 140 checks whether or not it is the function of the touch scenario selected by the first touch. If a user changes the function, the changed function is set to the corresponding function of the touch scenario.

If a user touches the storing box (B4), the controller 140 sets the weak touch or strong touch corresponding to the detected touch intensity to the touch intensity of the second touch, and temporarily stores the set touch intensity of the second touch in the storing part 150. The touch intensity of the touch scenario is set by the combination of the touch intensities of the first and second touches temporarily stored in the storing part 150, and is stored in the storing part 150.

According to the aforementioned method, the controller 140 sets the touch intensity of the first and second touches by each touch scenario, and stores the set touch intensity in the storing part 150, thereby completing the intensity setting of the touch scenario.

Figure 6:
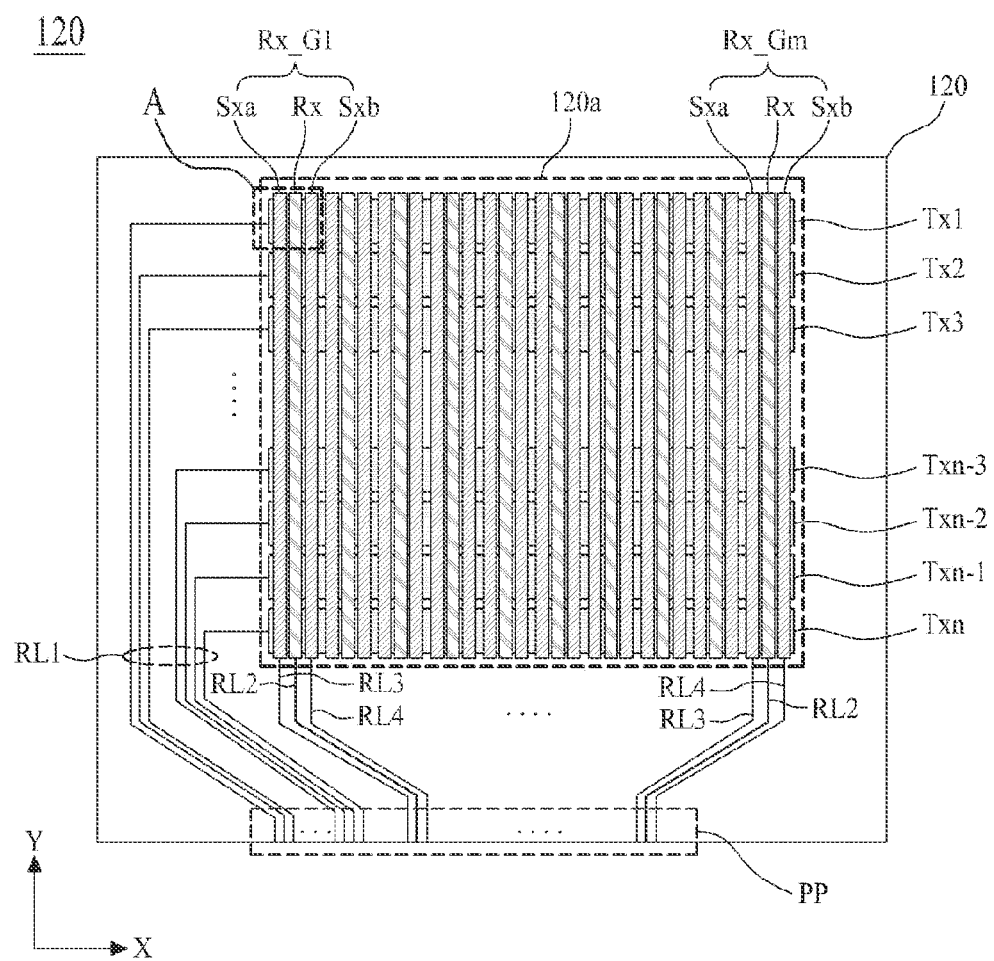
FIG. 6 illustrates a touch screen, shown in FIG. 1, according to one embodiment of the present invention.

FIG. 6 illustrates a touch screen according to one embodiment of the present invention shown in FIG. 1.

Referring to FIG. 6, the touch screen 120 according to one embodiment of the present invention may include first to n-th touch driving electrodes (Tx1~Txn), an elastic dielectric member (not shown) disposed on the first to n-th touch driving electrodes (Tx1~Txn), and first to m-th touch sensing electrode groups (Rx_G1~Rx_Gm) disposed on the elastic dielectric member, and respectively overlapped and intersected with the respective first to n-th touch driving electrodes (Tx1~Txn).

The first to n-th touch driving electrodes (Tx1~Txn) are provided at fixed intervals along a second direction (Y) of a touch sensing area 120a of the touch screen 120, wherein each of the first to n-th touch driving electrodes (Tx1~Txn) is formed in a bar shape extending in a first direction (X) of the touch screen 120. Each of the first to n-th touch driving electrodes (Tx1~Txn) is connected with a touch driver 130 through a corresponding driving routing line (RL1) and a pad portion (PP) formed in a first edge of the touch screen 120.

The elastic dielectric member may be formed of a material with elasticity and dielectric constant, and may be disposed on the first to n-th touch driving electrodes (Tx1~Txn).

The first to m-th touch sensing electrode groups (Rx_G1~Rx_Gm) are formed at fixed intervals along the first direction (X) on the touch sensing area 120a of the touch screen 120, wherein the first to m-th touch sensing electrode groups (Rx_G1~Rx_Gm) respectively intersect with the first to n-th touch driving electrodes (Tx1~Tnx). Each of the first to m-th touch sensing electrode groups (Rx_G~Rx_Gm) is formed in a bar shape extending in the second direction (Y) of the touch screen 120.

Each of the first to m-th touch sensing electrode groups (Rx_G1~Rx_Gm) may include a touch sensing electrode (Rx), and first sub-electrode (Sxa) and second sub-electrode (Sxb).

The touch sensing electrode (Rx) is used as a touch location/intensity sensing electrode for sensing the touch location or touch intensity. The touch sensing electrode (Rx) is connected with the touch driver 130 through a pad portion (PP) and a sensing routing line (RL2) formed in a second edge of the touch screen 120. The touch sensing electrode (Rx) is used as an upper haptic electrode for the aforementioned haptic effect.

The first sub-electrode (Sxa) is used only as the touch intensity sensing electrode for sensing the touch intensity or upper haptic electrode for the aforementioned haptic effect. The first sub-electrode (Sxa) is connected with the touch driver 130 through a first dummy routing line (RL3) and a pad portion (PP) formed in the second edge of the touch screen 120.

The second sub-electrode (Sxb) is used only as the touch intensity sensing electrode for sensing the touch intensity or upper haptic electrode for the aforementioned haptic effect. The second sub-electrode (Sxb) is connected with the touch driver 130 through a second dummy routing line (RL4) and a pad portion (PP) formed in the second edge of the touch screen 120.

Figure 7:
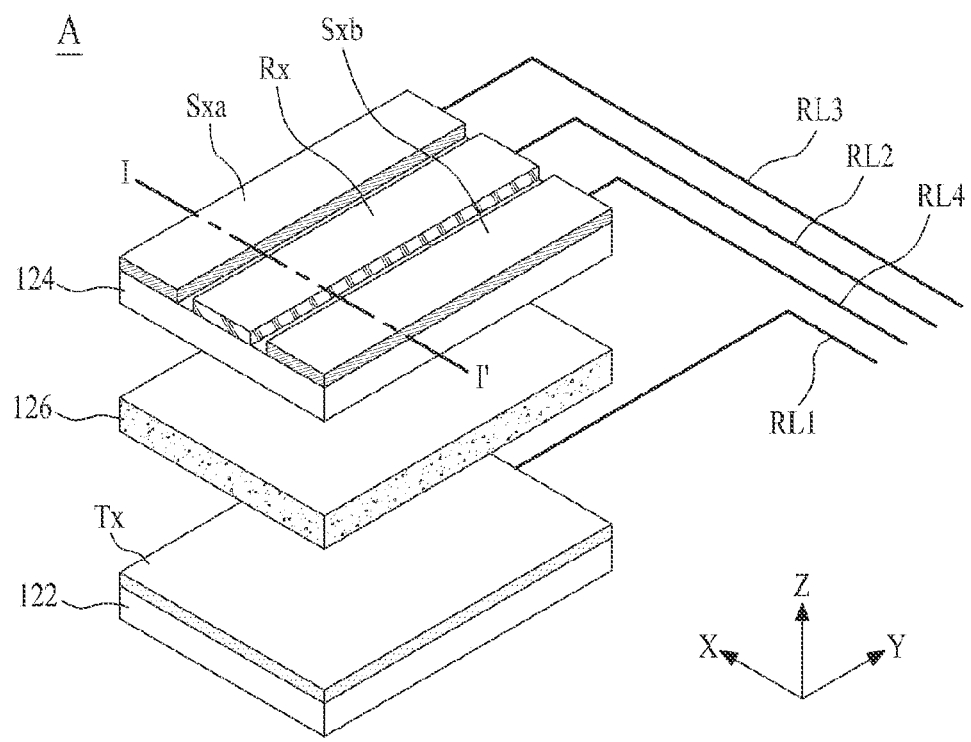
FIG. 7 is a perspective view illustrating an electrode structure of the touch screen according to one embodiment of the present invention.
Figure 8:
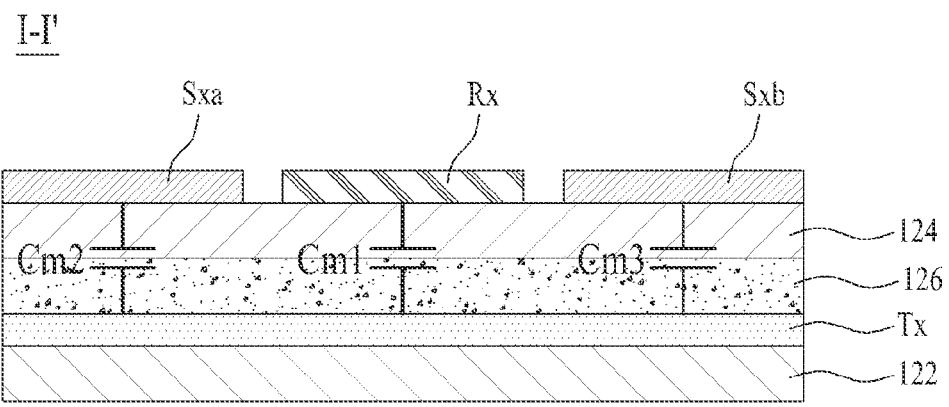
FIG. 8 is a cross sectional view of the electrode structure of the touch screen along I-I' of FIG. 7.

FIG. 7 is a perspective view illustrating an electrode structure of the touch screen according to one embodiment of the present invention, which relates to a structure corresponding to 'A' of FIG. 6. FIG. 8 is a cross sectional view along I-I' of FIG. 7.

Referring to FIGS. 7 and 8, the touch screen 120 according to one embodiment of the present invention may include a first substrate 122 with the touch driving electrode (Tx), a second substrate 124 with the touch sensing electrode (Rx) and the first and second sub-electrodes (Sxa, Sxb), and an elastic dielectric member 126 disposed between the first and second substrates 122 and 124. Herein, the touch location and the touch intensity may be sensed by the use of elastic dielectric member 126.

The first substrate 122 may be formed of a transparent plastic material. The first substrate 122 may be attached to an upper surface of the display part 110 by the use of transparent adhesive (not shown). The second substrate 124 may be formed of the transparent plastic material which is the same as that of the first substrate 122. The first and second substrates 122 and 124 confront each other with the elastic dielectric member 126 interposed in-between.

The touch driving electrode (Tx) is provided in the first direction (X) on the first substrate 122, wherein the touch driving electrode (Tx) is formed in the bar shape with a predetermined area extending in the first direction (X) of the touch screen 120. The touch driving electrode (Tx) is connected with the touch driver (not shown) through the driving routing line (RL1), and is supplied with the touch driving pulse from the touch driver. The touch driving electrode (Tx) is used as a sensing driving electrode supplied with the touch driving pulse for sensing the touch position or touch intensity.

The touch sensing electrode (Rx) is provided in the second direction (Y) on the second substrate 124 being overlapped with the touch driving electrode (Tx), and the touch sensing electrode (Rx) is formed in the bar shape with a predetermined area extending in the second direction (Y) of the touch screen 120. In this case, with respect to a lengthwise direction, a width of the touch sensing electrode (Rx) is smaller than a width of the touch driving electrode (Tx). The touch sensing electrode (Rx) is connected with the touch driver through the sensing routing line (RL2), whereby the touch sensing electrode (Rx) is used as the touch location/intensity sensing electrode for sensing the touch location or touch intensity.

The first sub-electrode (Sxa) is formed in the bar shape with a predetermined area extending in the second direction (Y), and is provided on the second substrate 124 while being in parallel to one side of the touch sensing electrode (Rx) being overlapped with the touch driving electrode (Tx). In this case, with respect to the lengthwise direction, the first sub-electrode (Sxa) may be provided at a predetermined interval from one side of the touch sensing electrode (Rx), and a width of the first sub-electrode (Sxa) may be smaller than a width of the touch driving electrode (Tx), or may be the same as a width of the touch sensing electrode (Rx). Accordingly, as the first sub-electrode (Sxa) is connected with the touch driver through the first dummy routing line (RL3), the first sub-electrode (Sxa) may be floating by the touch driver or may be electrically connected with the touch sensing electrode (Rx) or sensing routing line (RL2). For example, the first sub-electrode (Sxa) may be electrically floating in a touch location sensing mode, to thereby improve a touch location sensing efficiency. Also, the first sub-electrode (Sxa) may be electrically connected with the touch sensing electrode (Rx) in a touch intensity sensing mode, to thereby increase an area of the touch intensity sensing electrode and furthermore improve a touch intensity sensing efficiency.

The second sub-electrode (Sxb) is formed in the bar shape with a predetermined area extending in the second direction (Y), and is provided on the second substrate 124 while being in parallel to the other side of the touch sensing electrode (Rx) being overlapped with the touch driving electrode (Tx). In this case, with respect to the lengthwise direction, the second sub-electrode (Sxb) may be provided at a predetermined interval from the other side of the touch sensing electrode (Rx), and a width of the second sub-electrode (Sxb) may be smaller than a width of the touch driving electrode (Tx), or may be the same as a width of the touch sensing electrode (Rx) or first sub-electrode (Sxa). Accordingly, as the second sub-electrode (Sxb) is connected with the touch driver through the second dummy routing line (RL4), the second sub-electrode (Sxb) may be floating by the touch driver or may be electrically connected with the touch sensing electrode (Rx). For example, the second sub-electrode (Sxb) may be electrically floating in a touch location sensing mode, to thereby improve a touch location sensing efficiency. Also, the second sub-electrode (Sxb) may be electrically connected with the touch sensing electrode (Rx) in a touch intensity sensing mode, to thereby increase an area of the touch intensity sensing electrode and furthermore improve a touch intensity sensing efficiency.

In FIGS. 6 and 7, each of the first and second sub-electrodes (Sxa, Sxb) is formed in one bar shape, but is not limited to this shape. In order to improve a transmittance of light emitted from the display part 110, each of the first and second sub-electrodes (Sxa, Sxb) may be formed in a structure with a plurality of lines, a mesh structure or a ladder structure including a plurality of sub-electrodes electrically connected with one another, or may include a plurality of slits at fixed intervals or a plurality of openings arranged in a grid pattern.

In addition, the touch sensing electrode (Rx) and the first and second sub-electrodes (Sxa, Sxb) may be formed on a rear surface of the second substrate 124 to face the elastic dielectric member 126.

The elastic dielectric member 126 is interposed between the first substrate 122 and the second substrate 124. In this case, the elastic dielectric member 126 may be attached to an upper surface of the first substrate 122 or a lower surface of the second substrate 124 by the use of transparent adhesive. The elastic dielectric member 126 may be formed of a material with elasticity and high dielectric constant. For example, the elastic dielectric member 126 may be formed of PDMS (polydimethylsiloxane), acrylic or poly-urethane material, but is not limited to these materials. The elastic dielectric member 126 may be formed of any material with elasticity and high dielectric constant.

The elastic dielectric member 126 forms a capacitance (Cm1, Cm2, Cm3) among the touch sensing electrode (Rx), each of the first and second sub-electrodes (Sxa, Sxb), and the touch driving electrode (Tx). Especially, the elastic dielectric member 126 is deformed due to its elasticity by a user's touch intensity, and thus changed in its thickness, to thereby change the capacitance (Cm1, Cm2, Cm3). In this case, the capacitance (Cm1, Cm2, Cm3) may be changed in accordance with each distance among the touch sensing electrode (Rx), each of the first and second sub-electrodes (Sxa, Sxb), and the touch driving electrode (Tx). In this case, since the capacitance (Cm1, Cm2. Cm3) is inversely proportional to each distance among the electrodes, the touch force may be sensed by a force level algorithm for modeling an increased variation of the capacitance (Cm1, Cm2, Cm3) in accordance with the touch intensity.

Since the elastic dielectric member 126 with elasticity and high dielectric constant is interposed between the first and second substrates 122 and 124, a first touch sensor (Cm1) for sensing the touch location or touch intensity is formed at an intersection of the touch driving electrode (Tx) and the touch sensing electrode (Rx). The first touch sensor (Cm1) is formed by a dielectric constant of the elastic dielectric member 126, and a capacitance based on an overlapping area between the touch driving electrode (Tx) and the touch sensing electrode (Rx) and a distance between the touch driving electrode (Tx) and the touch sensing electrode (Rx). In this case, an electric charge corresponding the touch driving pulse supplied to the touch driving electrode (Tx) is charged in the first touch sensor (Cm1), and the electric charge of the first touch sensor (Cm1) is discharged to the touch sensing electrode (Rx). An amount of electric charge in the first touch sensor (Cm1) varies according to whether or not there is a user's touch.

Figure 9A:
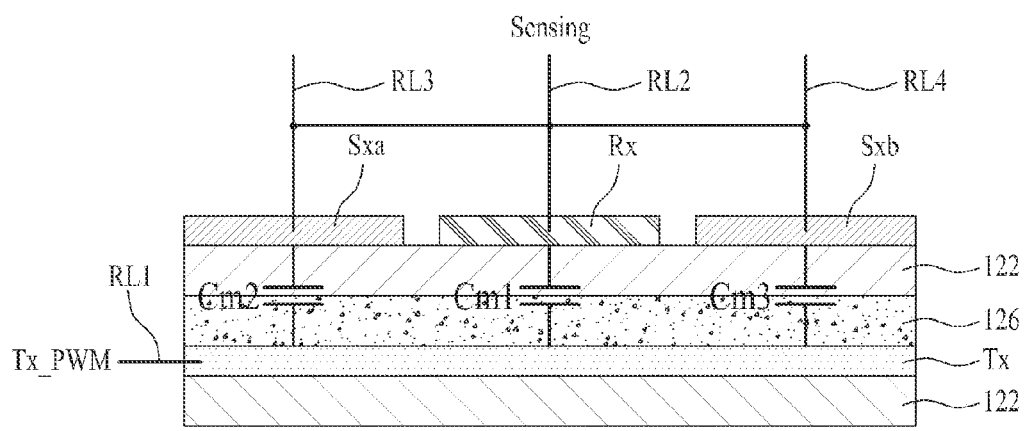
FIGS. 9A, 9B, and 9C are cross sectional views illustrating a connection between a touch sensing electrode and each of first and second sub-electrodes in accordance with a touch intensity sensing mode, a touch location sensing mode and a haptic driving mode according to one embodiment of the present invention.

As shown in FIG. 9A, when the first sub-electrode (Sxa) is electrically connected with the touch sensing electrode (Rx) or sensing routing line (RL2) in accordance with the touch intensity sensing mode, the first sub-electrode (Sxa) functions as the touch intensity sensing electrode which is identical to the touch sensing electrode (Rx), whereby a second touch sensor (Cm2) for sensing the touch intensity is formed at an intersection between the touch driving electrode (Tx) and the first sub-electrode (Sxa). The second touch sensor (Cm2) is formed by a dielectric constant of the elastic dielectric member 126, and a capacitance based on an overlapping area between the touch driving electrode (Tx) and the first sub-electrode (Sxa) and a distance between the touch driving electrode (Tx) and the first sub-electrode (Sxa). At this time, the capacitance of the second touch sensor (Cm2) varies in accordance with the distance between the touch driving electrode (Tx) and the first sub-electrode (Sxa). In this case, an electric charge corresponding to the touch driving pulse (Tx_PWM) supplied to the touch driving electrode (Tx) is charged in the second touch sensor (Cm2), and the electric charge of the second touch sensor (Cm2) is discharged to the first sub-electrode (Sxa). An amount of electric charge in the second touch sensor (Cm2) varies in accordance with the distance between the touch driving electrode (Tx) and the first sub-electrode (Sxa) by a user's touch intensity.

Figure 9B:
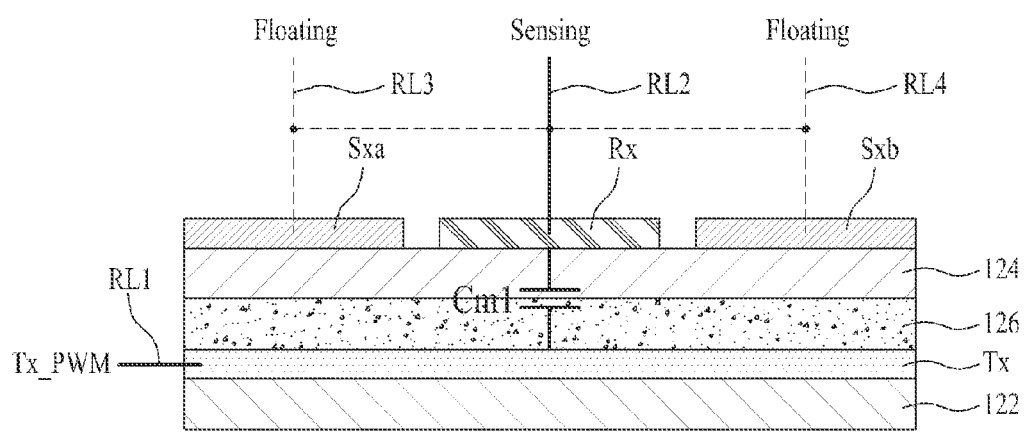

Meanwhile, as shown in FIG. 9B, when the first sub-electrode (Sxa) is electrically floating without being connected with the touch sensing electrode (Rx) in accordance with the touch location sensing mode, the capacitance (Cm2) is not formed between the touch driving electrode (Tx) and the first sub-electrode (Sxa). Accordingly, the capacitance of the first touch sensor (Cm1) formed between the touch driving electrode (Tx) and the touch sensing electrode (Rx) is changed in accordance with the touch by the use of conductive object (for example, finger) or non-conductive object (for example, touch pen), whereby it is possible to sense the touch location, and furthermore to improve the touch location sensing efficiency.

As shown in FIG. 9A, when the second sub-electrode (Sxb) is electrically connected with the touch sensing electrode (Rx) or sensing routing line (RL2) in accordance with the touch intensity sensing mode, the second sub-electrode (Sxb) functions as the touch intensity sensing electrode which is identical to the touch sensing electrode (Rx), whereby a third touch sensor (Cm3) for sensing the touch intensity is formed at an intersection between the touch driving electrode (Tx) and the second sub-electrode (Sxb). The third touch sensor (Cm3) is formed by a dielectric constant of the elastic dielectric member 126, and a capacitance based on an overlapping area between the touch driving electrode (Tx) and the second sub-electrode (Sxb) and a distance between the touch driving electrode (Tx) and the second sub-electrode (Sxb). At this time, the capacitance of the third touch sensor (Cm3) varies in accordance with the distance between the touch driving electrode (Tx) and the second sub-electrode (Sxb). In this case, an electric charge corresponding to the touch driving pulse (Tx_PWM) supplied to the touch driving electrode (Tx) is charged in the third touch sensor (Cm3), and the electric charge of the third touch sensor (Cm3) is discharged to the second sub-electrode (Sxb). An amount of electric charge in the third touch sensor (Cm3) varies in accordance with the distance between the touch driving electrode (Tx) and the second sub-electrode (Sxb) by a user's touch intensity.

Meanwhile, as shown in FIG. 9B, when the second sub-electrode (Sxb) is electrically floating without being connected with the touch sensing electrode (Rx) in accordance with the touch location sensing mode, the capacitance (Cm3) is not formed between the touch driving electrode (Tx) and the second sub-electrode (Sxb). Accordingly, the capacitance of the first touch sensor (Cm1) formed between the touch driving electrode (Tx) and the touch sensing electrode (Rx) is changed in accordance with the touch by the use of conductive object, whereby it is possible to sense the touch location, and furthermore to improve the touch location sensing efficiency.

Figure 9C:
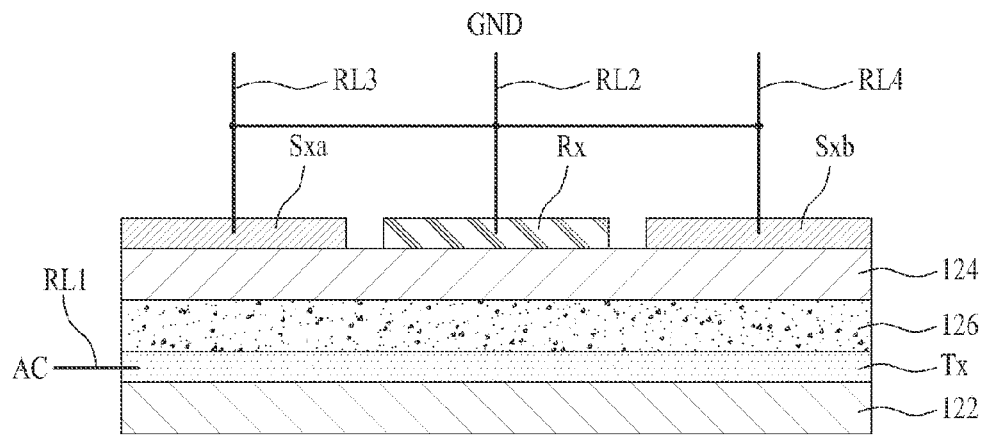

The elastic dielectric member 126 functions as a haptic output device. That is, when a ground voltage (GND) is applied to the touch sensing electrode (RX) and each of the first and second sub-electrodes (Sxa. Sxb), and an AC (alternating current) voltage (AC) is applied to the touch driving electrode (Tx), the elastic dielectric member 126 is vibrated in accordance with a frequency of the AC voltage (AC) through the repetitive expansion and shrinkage by the means of piezoelectric effect, and an intensity of the vibration is changed in accordance with an amplitude of the AC voltage (AC). Accordingly, the controller 140 according to the embodiment of the present invention generates an electrode connection signal for electrically connecting the first and second sub-electrodes (Sxa, Sxb) with the touch sensing electrode (Rx), a haptic area corresponding to the touch location, and a haptic driving signal in accordance with the touch intensity, and then provides the generated electrode connection signal, the haptic area and the haptic driving signal to the touch driver 130. Then, as shown in FIG. 9C, the touch driver 130 electrically connects the first and second sub-electrodes (Sxa, Sxb) with the touch sensing electrode (Rx), generates the AC voltage (AC) in accordance with the haptic driving signal, supplies the generated AC voltage (AC) to the touch driving electrode (Tx) included in the haptic area, and supplies the ground voltage to the touch sensing electrode (Rx). Accordingly, the haptic effect such as the vibration is formed in the haptic area by the ground voltage (GND) and the AC voltage (AC) applied to the elastic dielectric member 126. As a result, the elastic dielectric member 126 is utilized as the haptic output device, that is, actuator, whereby it is possible to provide the haptic effect without providing the additional haptic output device.

Additionally, one side of the first sub-electrode (Sxa) is electrically connected with one side of the second sub-electrode (Sxb) through a bridge electrode (not shown). That is, the bridge electrode is provided at a predetermined interval from one side of the touch sensing electrode (Rx) while being in parallel to one side of the touch sensing electrode (Rx), whereby the bridge electrode is electrically connected with one side of the first sub-electrode (Sxa) and one side of the second sub-electrode (Sxb). Accordingly, the bridge electrode and the first and second sub-electrodes (Sxa, Sxb) are provided in shape of "⊂" or "⊃".

Figure 10:
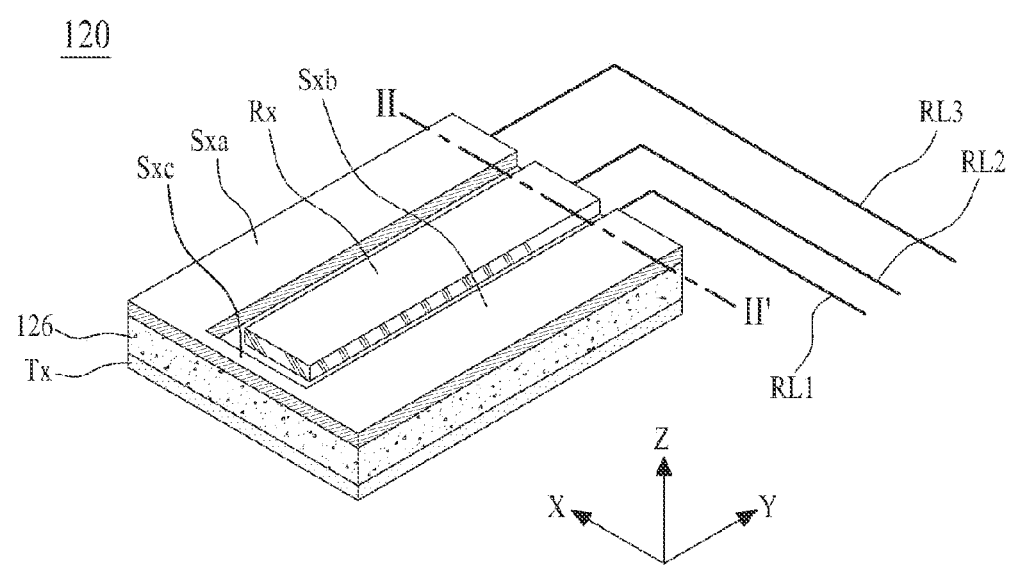
FIG. 10 is a perspective view illustrating an electrode structure of a touch screen according to another embodiment of the present invention.

FIG. 10 is a perspective view illustrating an electrode structure of a touch screen according to another embodiment of the present invention, which relates to a structure corresponding to 'A' of FIG. 6.

In the touch screen 120 according to another embodiment of the present invention, a touch driving electrode (Tx) is formed on a lower surface of an elastic dielectric member 126, and a touch sensing electrode (RX) and first and second sub-electrodes (Sxa, Sxb) are formed on an upper surface of the elastic dielectric member 126. That is, the touch driving electrode (Tx), the touch sensing electrode (Rx) and the first and second sub-electrodes (Sxa, Sxb) are formed in the elastic dielectric member 126 of the touch screen 120 according to another embodiment of the present invention, and first and second substrates 122 and 124 are removed from the touch screen 120 according to another embodiment of the present invention. Except that the first and second substrates 122 and 124 are omitted, the touch screen 120 according to another embodiment of the present invention is identical in electrode structure to the touch screen 120 shown in FIG. 6, whereby it is possible to sense both touch location and touch intensity, and furthermore to realize a small thickness owing to a simplified structure.

The aforementioned touch screen 120 includes the first and second sub-electrodes (Sxa, Sxb), but not necessarily. Any one of the first and second sub-electrodes (Sxa, Sxb) is electrically floating without regard to the sensing mode, and the other is electrically floating or connected with the touch sensing electrode in accordance with the sensing mode. Also, the touch screen 120 according to a modified embodiment of the present invention may include any one of the first and second sub-electrodes (Sxa, Sxb). In this case, it may cause the decrease in the area of electrode used as the touch sensing electrode for sensing the touch intensity in accordance with the touch intensity sensing mode, however, an electric field forming area formed between the touch driving electrode (Tx) and the touch sensing electrode (Rx) is increased in size by an area of one sub-electrode in accordance with the touch location sensing mode, to thereby improve the touch location sensing efficiency.

If the mobile terminal device according to one embodiment of the present invention is provided with the touch screen 120 shown in FIGS. 6 to 10, the aforementioned controller 140 senses the touch location by the capacitance method, and senses the touch intensity by the change of the capacitance through the change of the thickness in the elastic dielectric member 126 in accordance with the touch intensity. Also, the aforementioned controller 140 applies the signal to the electrodes formed on the lower and upper surfaces of the elastic dielectric member 126, to thereby provide the haptic effect such as the vibration in the haptic area corresponding to the touch location.

Figure 11:
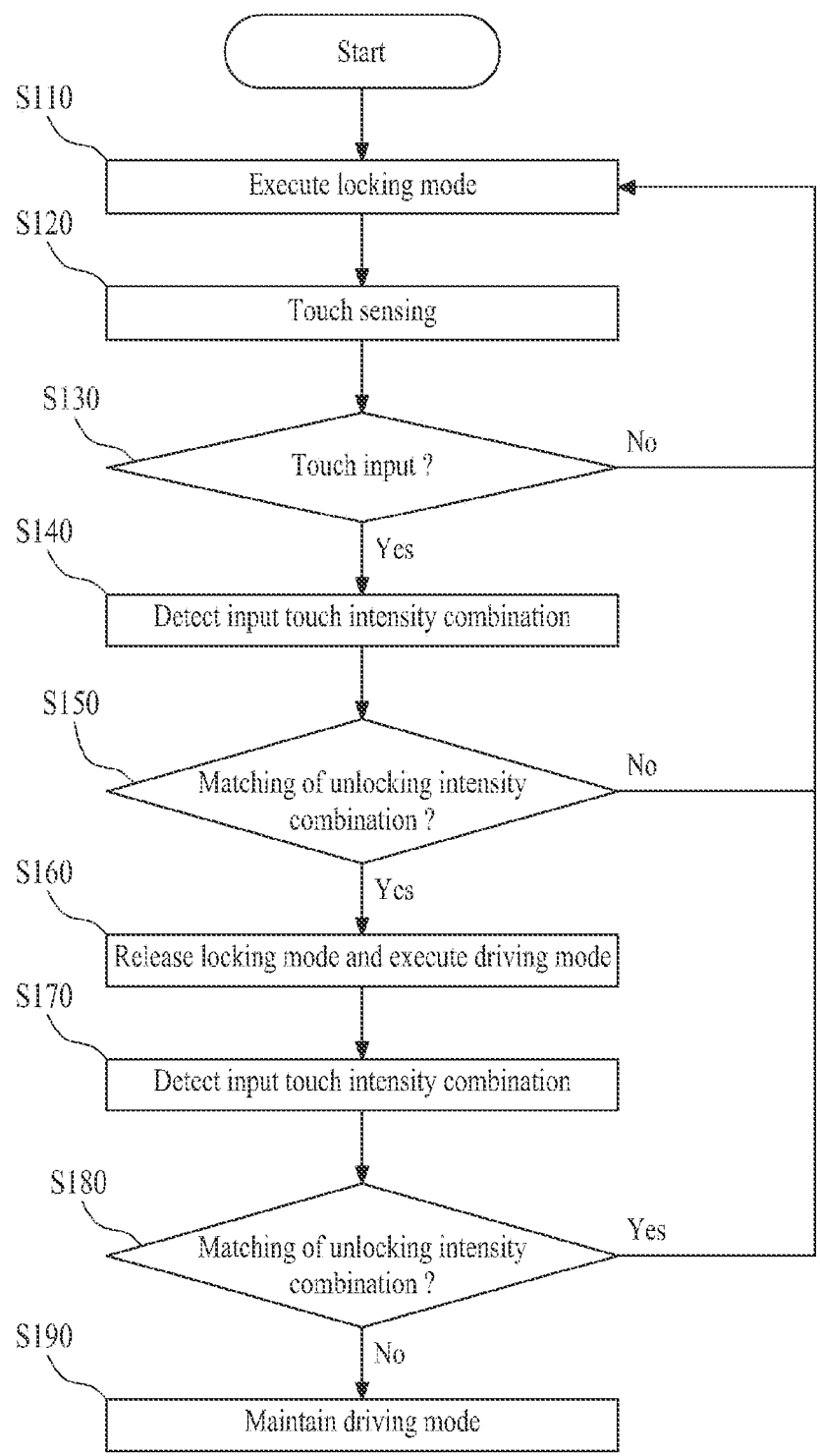
FIG. 11 is a flow chart illustrating an unlocking method of the mobile terminal device according to one embodiment of the present invention.

FIG. 11 is a flow chart of the unlocking method in the driving method of the mobile terminal device according to one embodiment of the present invention.

The unlocking method in the driving method of the mobile terminal device according to one embodiment of the present invention will be described with reference to FIG. 11 in connection with FIG. 1.

First, as shown in FIG. 3, the first and second reference values respectively defining the weak touch and the strong touch are preset by a user, and are stored in the storing part 150. Also, the unlocking intensity combination made by the combination of the weak touch and strong touch is preset by a user, and is stored in the storing part 150.

In the execution (S110) of the locking mode, the controller 140 senses (S120) the plurality of touches for releasing the locking mode through the use of touch driver 130.

The controller 140 determines (S130) whether the touch input is received. If the plurality of touches occur in the locking mode ("Yes" of S130), the controller 140 detects (S140) the plurality of touch intensities from the intensity sensing data of each of the plurality of touches provided from the touch driver 130, and classifies the plurality of touch intensities detected in the locking mode into the weak touch and the strong touch with respect to the first and second reference values stored in the storing part 150, wherein the second reference value is larger than the first reference value, to thereby detect the input touch intensity combination.

Then, the controller 140 checks (S150) whether or not the input touch intensity combination detected in the locking mode is matched to the unlocking intensity combination stored in the storing part 150.

Based on the result of the checking (S150), if the unlocking intensity combination is matched to the input touch intensity combination detected in the locking mode ("Yes" of S150), the controller 140 executes (S160) the driving mode of the mobile terminal device by releasing the locking mode.

If the plurality of touches for the execution of the locking mode occur in the driving mode, the controller 140 detects (S170) the input touch intensity combination from the intensity sensing data of the plurality of touches.

The controller 140 checks (S180) whether or not the input touch intensity combination detected in the driving mode is matched to the unlocking intensity combination stored in the storing part 150.

Based on the result of S180, if the unlocking intensity combination is not matched to the input touch intensity combination detected in the driving mode ("No" of S180), the controller 140 maintains (S190) the execution of the driving mode.

Meanwhile, if the plurality of touches do not occur in the locking mode ("No" of S130) on the basis of the result of S130, and the unlocking intensity combination is not matched to the input touch intensity combination detected in the locking mode ("No" of S130) on the basis of the result of S150, the controller 140 maintains the execution of the locking mode without releasing the locking mode. Based on the result of S180, if the unlocking intensity combination is matched to the input touch intensity combination detected in the driving mode ("Yes" of S180), the controller 140 executes the locking mode (S110).

The unlocking intensity combination may be set based on the touch intensity by each touch location. In this case, the controller 140 may sense the touch location and the touch intensity by each touch location, detect the input touch intensity combination from the touch intensity by each touch location sensed, and then execute the driving mode by releasing the locking mode or maintain the execution of the locking mode according to whether the unlocking intensity combination which is set based on the touch intensity by each touch location and stored in the storing part 150 is matched to the detected input touch intensity combination. Also, the controller 140 may execute the locking mode or maintain the execution of the driving mode according to whether or not the unlocking intensity combination detected by a user's touch on the driving mode is matched to the detected input touch intensity combination.

Figure 12:
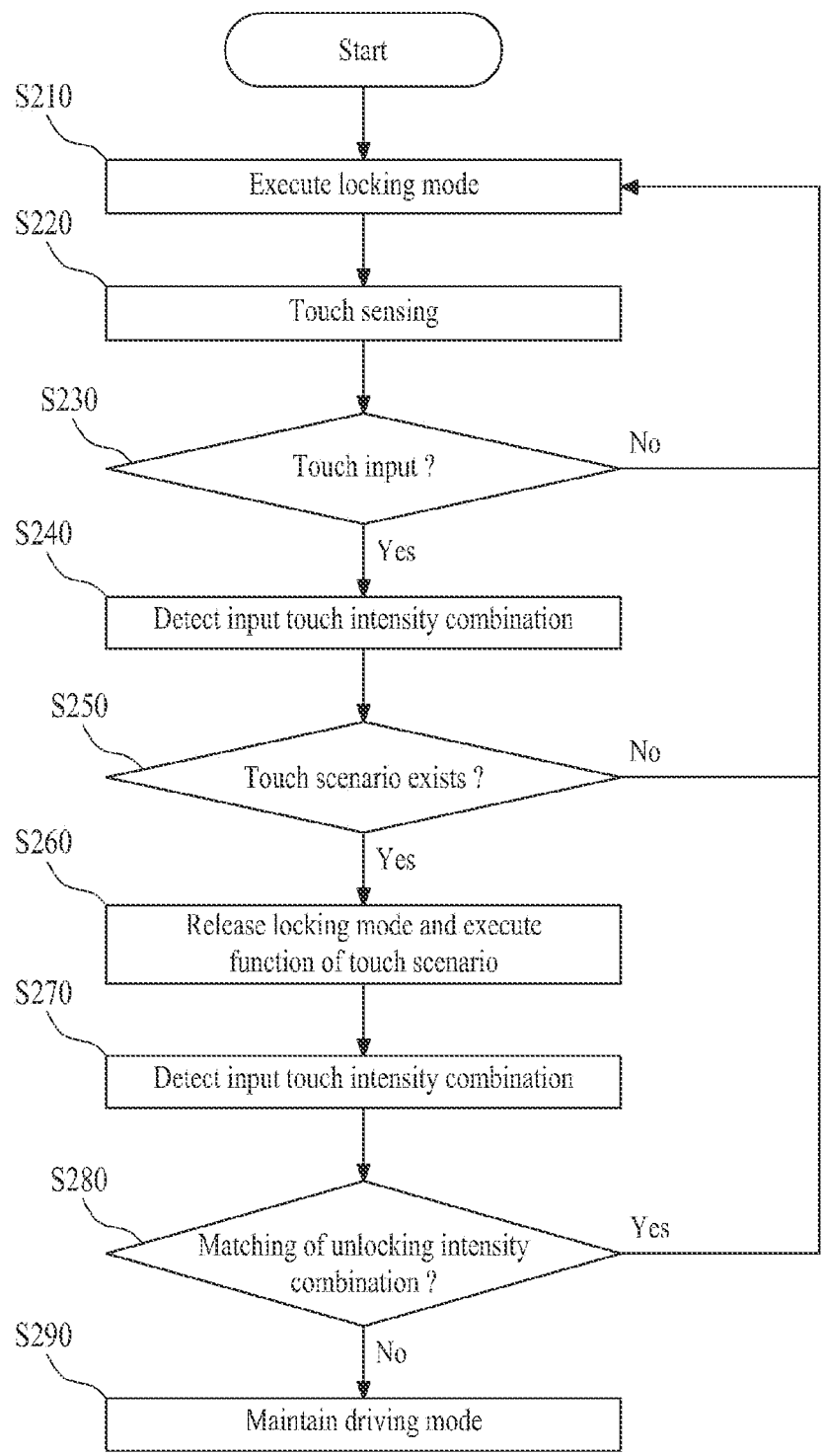
FIG. 12 is a flow chart illustrating a shortcut execution method of the mobile terminal device according to one embodiment of the present invention.

FIG. 12 is a flow chart of the shortcut execution method on the locking mode in the driving method of the mobile terminal device according to one embodiment of the present invention.

The shortcut execution method on the locking mode in the driving method of the mobile terminal device according to one embodiment of the present invention will be described with reference to FIG. 12 in connection with FIG. 1.

First, as shown in FIGS. 3 to 5, the first and second reference values respectively defining the weak touch and the strong touch are preset by a user, and are stored in the storing part 150. Also, the plurality of touch scenarios and the unlocking intensity combination made by the combination of the weak touch and strong touch are preset by a user, and are stored in the storing part 150.

In execution (S210) of the locking mode, the controller 140 senses (S220) the plurality of touches for the shortcut execution through the use of touch driver 130.

If the plurality of touches occur in the locking mode ("Yes" of S230), the controller 140 detects (S240) the plurality of touch intensities from the intensity sensing data of each of the plurality of touches provided from the touch driver 130, and classifies the plurality of touch intensities detected in the locking mode into the weak touch and the strong touch with respect to the first and second reference values stored in the storing part 150, wherein the second reference value is larger than the first reference value, to thereby detect the input touch intensity combination.

Then, the controller 140 checks (S250) whether the touch scenario which is matched to the input touch intensity combination detected in the locking mode exists in the plurality of touch scenarios stored in the storing part 150.

Based on the result of S250, if the touch scenario which is matched to the detected input touch intensity combination exists in the plurality of touch scenarios ("Yes" of S250), the controller 140 releases (S260) the locking mode, and simultaneously executes the function preset in the touch scenario which is matched to the input touch intensity combination.

Then, if the plurality of touches for the execution of the locking mode occur in the driving mode, the controller 140 detects (S270) the input touch intensity combination from the intensity sensing data of the plurality of touches.

Then, the controller 140 checks (S280) whether the input touch intensity combination detected in the driving mode is matched to the unlocking intensity combination stored in the storing part 150.

Based on the result of S280, if the unlocking intensity combination is not matched to the input touch intensity combination detected in the driving mode ("No" of S280), the controller 140 maintains (S290) the execution of the driving mode.

Meanwhile, if the plurality of touches do not occur in the locking mode ("No" of S230) on the basis of the result of S230, and the touch scenario which is matched to the detected input touch intensity combination does not exist in the plurality of touch scenarios ("No" of S250) on the basis of the result of S250, the controller 140 maintains the execution of the locking mode without releasing the locking mode. Based on the result of S280, if the unlocking intensity combination is matched to the input touch intensity combination detected in the driving mode ("Yes" of S280), the controller 140 executes the locking mode (S210).

The mobile terminal device described in this specification may include portable phone, smart phone, laptop computer, PDA (personal digital assistants), PMP (portable multimedia player), navigation, slate PC, table PC, ultra book, and etc., which include the function for releasing the locking mode in accordance with a user's touch on the touch screen.

According to one embodiment of present invention, the locking mode is released based on the touch intensity so that it is possible to prevent the locking mode from being released by a user's unintended touch.

Also, the locking mode is executed and released based on the touch intensity, thereby enhancing security of the mobile terminal device.

Furthermore, the locking mode is released based on the touch intensity by a user. At the same time, the function corresponding to the touch intensity is executed in the mobile terminal device, to thereby decrease the number of touches for the function execution on the locking mode.

Owing to the elastic dielectric member interposed between the touch driving electrode and the touch sensing electrode, the touch location and the touch intensity may be sensed by the non-conductive object as well as the finger.

It will be apparent to those skilled in the art that various modifications and variations can be made to embodiments of the present invention without departing from the spirit or scope of the invention. Thus, it is intended that the present invention covers the modifications and variations of this invention provided they come within the scope of the appended claims and their equivalents.

What is claimed is:

1. A method of operation in a mobile terminal device with a touch screen comprising:
   (A) detecting a touch intensity for each touch when a plurality of touches occur in a locking mode; and
   (B) releasing the locking mode or executing a function on a basis of a temporal order of the plurality of detected touch intensities,
   wherein releasing the locking mode or executing the function on a basis of the temporal order of the plurality of detected touch intensities includes:
   responsive to detecting a first plurality of touches with a first temporal order of touch intensities, maintaining the locking mode of the mobile terminal device, and
   responsive to detecting a second plurality of touches with a second temporal order of touch intensities that match a preset touch scenario, releasing the locking mode or executing the function on the mobile terminal device.

2. The method of claim 1, wherein the step (B) includes:
   detecting an input touch intensity combination in a combination of weak and strong touches by classifying the plurality of detected touch intensities into the weak and strong touches with respect to first and second reference values, wherein the second reference value is larger than the first reference value; and
   releasing the locking mode when a preset unlocking intensity combination is matched to the detected input touch intensity combination.

3. The method of claim 1, wherein the step (B) includes:
   detecting an input touch intensity combination in a combination of weak and strong touches by classifying the plurality of detected touch intensities into the weak and strong touches with respect to first and second reference values, wherein the second reference value is larger than the first reference value; and
   if a touch scenario which is matched to the detected input touch intensity combination is determined to exist in a plurality of preset touch scenarios, releasing the locking mode and executing a function preset in the touch scenario which is matched to the detected input touch intensity combination,
   wherein each of the plurality of touch scenarios is formed by a combination of the weak touch and the strong touch which are selected by a user and are different from each other, and the plurality of touch scenarios are respectively set with different functions selected by a user.

4. The method of claim 1, wherein the step (A) includes detecting the touch intensity in each of the plurality of touches by sensing a change of a capacitance in accordance with a change of a thickness in an elastic dielectric member interposed between a touch driving electrode and a touch sensing electrode.

5. The method of claim 4, wherein the step (A) further includes detecting a haptic area corresponding to a touch location, and generating a vibration corresponding to the detected touch intensity in the haptic area.

6. A method of operating a mobile terminal device with a touch screen comprising:
   (A) detecting a touch location and a touch intensity of each touch on the touch screen when a plurality of touches on the touch screen occurs in a locking mode; and
   (B) releasing the locking mode on a basis of a temporal order of the touch intensity and the touch location of each touch in the plurality of touches on the touch screen,
   wherein releasing the locking mode on the basis of the temporal order of the touch intensity and the touch location of each touch in the plurality of touches on the touch screen includes:
   responsive to detecting a first plurality of touches with a first temporal order of touch intensities and touch locations on the touch screen, maintaining the locking mode of the mobile terminal device, and
   responsive to detecting a second plurality of touches with a second temporal order of touch intensities and touch locations that match a preset touch scenario, releasing the locking mode of the mobile terminal device.

7. The method of claim 6, wherein the step (B) includes:
   detecting an input touch intensity combination in a combination of weak and strong touches by classifying the plurality of detected touch intensities of each touch location into the weak and strong touches with respect to first and second reference values, wherein the second reference value is larger than the first reference value; and
   releasing the locking mode if a preset unlocking intensity combination is matched to the detected input touch intensity combination.

8. The method of claim 7, wherein the step (A) includes detecting the touch intensity in each of the plurality of touches by sensing a change of a capacitance in accordance with a change of a thickness in an elastic dielectric member interposed between a touch driving electrode and a touch sensing electrode.

9. The method of claim 8, wherein the step (A) further includes detecting a haptic area corresponding to the touch location, and generating a vibration corresponding to the detected touch intensity in the haptic area.

10. A mobile terminal device comprising:
    a touch screen;
    a touch driver for generating sensing data by sensing a touch on the touch screen; and
    a controller for detecting a touch intensity for each of a plurality of touches on a basis of sensing data for each of the plurality of touches provided from the touch driver on a locking mode, and releasing the locking mode or executing a function on a basis of a temporal order of the plurality of detected touch intensities,
    wherein:
    responsive to detecting a first plurality of touches with a first temporal order of touch intensities, the controller maintains the locking mode of the mobile terminal device, and
    responsive to detecting a second plurality of touches with a second temporal order of touch intensities that match a preset touch scenario, the controller releases the locking mode or executes the function on the mobile terminal device.

11. The mobile terminal device of claim 10, wherein the touch screen includes:

a plurality of touch driving electrodes;

an elastic dielectric member disposed on the plurality of touch driving electrodes; and a plurality of touch sensing electrode groups disposed in parallel to each other and provided at fixed intervals on the elastic dielectric member, and respectively overlapped and intersected with the plurality of touch driving electrodes, wherein each of the plurality of touch sensing electrode groups include a touch sensing electrode and a first sub-electrode.

12. The mobile terminal device of claim 11, wherein the touch driver connects the first sub-electrode with the touch sensing electrode for sensing the touch intensity, and makes the first sub-electrode electrically floating for sensing a touch location.

13. The mobile terminal device of claim 11, wherein each of the plurality of touch sensing electrode groups further includes a second sub-electrode provided in parallel to the first sub-electrode with the touch sensing electrode interposed therebetween, wherein the touch driver connects the first and second sub-electrodes with the touch sensing electrode in a unit of the touch sensing electrode group for sensing the touch intensity, and makes the first and second sub-electrodes electrically floating in a unit of the touch sensing electrode group for sensing a touch location.

14. The mobile terminal device of claim 13, wherein the controller detects a haptic area corresponding to the touch location, and generates a haptic driving signal corresponding to the detected touch intensity of the touch location, and wherein the touch driver generates a vibration in the haptic area by generating an alternating current (AC) voltage corresponding to the haptic driving signal, applying the generated AC voltage to the touch driving electrode included in the haptic area and applying a ground voltage to the first and second sub-electrodes and the touch sensing electrode of the touch sensing electrode group included in the haptic area.

15. The mobile terminal device of claim 10, wherein the controller detects a plurality of touch locations on the basis of the sensing data for each of the plurality of touches, detects the touch intensity by each touch location on the basis of the plurality of touch locations and touch intensities, and releases the locking mode on the basis of the touch intensity by each touch location.

16. The mobile terminal device of claim 15, wherein the touch screen includes:

a plurality of touch driving electrodes;

an elastic dielectric member disposed on the plurality of touch driving electrodes; and a plurality of touch sensing electrode groups disposed in parallel to each other and provided at fixed intervals on the elastic dielectric member, and respectively overlapped and intersected with the plurality of touch driving electrodes, wherein each of the plurality of touch sensing electrode groups includes a touch sensing electrode and a first sub-electrode.

17. The mobile terminal device of claim 16, wherein the touch driver connects the first sub-electrode with the touch sensing electrode for sensing the touch intensity, and makes the first sub-electrode electrically floating for sensing the touch location.

18. The mobile terminal device of claim 16, wherein each of the plurality of touch sensing electrode groups further includes a second sub-electrode provided in parallel to the first sub-electrode with the touch sensing electrode interposed therebetween, wherein the touch driver connects the first and second sub-electrodes with the touch sensing electrode in a unit of the touch sensing electrode group for sensing the touch intensity, and makes the first and second sub-electrodes electrically floating in a unit of the touch sensing electrode group for sensing the touch location.

19. The mobile terminal device of claim 18, wherein the controller detects a haptic area corresponding to the touch location, and generates a haptic driving signal corresponding to the detected touch intensity of the touch location, and wherein the touch driver generates a vibration in the haptic area by generating an AC voltage corresponding to the haptic driving signal, applying the generated AC voltage to the touch driving electrode included in the haptic area and applying a ground voltage to the first and second sub-electrodes and the touch sensing electrode of the touch sensing electrode group included in the haptic area.

20. The mobile terminal device of claim 10, wherein the controller provides a haptic effect in a touch area on the basis of the sensing data.

* * * * *